No. 773,370. PATENTED OCT. 25, 1904.
A. P. BROWN.
FRICTION CLUTCH.
APPLICATION FILED MAY 9, 1904.
NO MODEL.
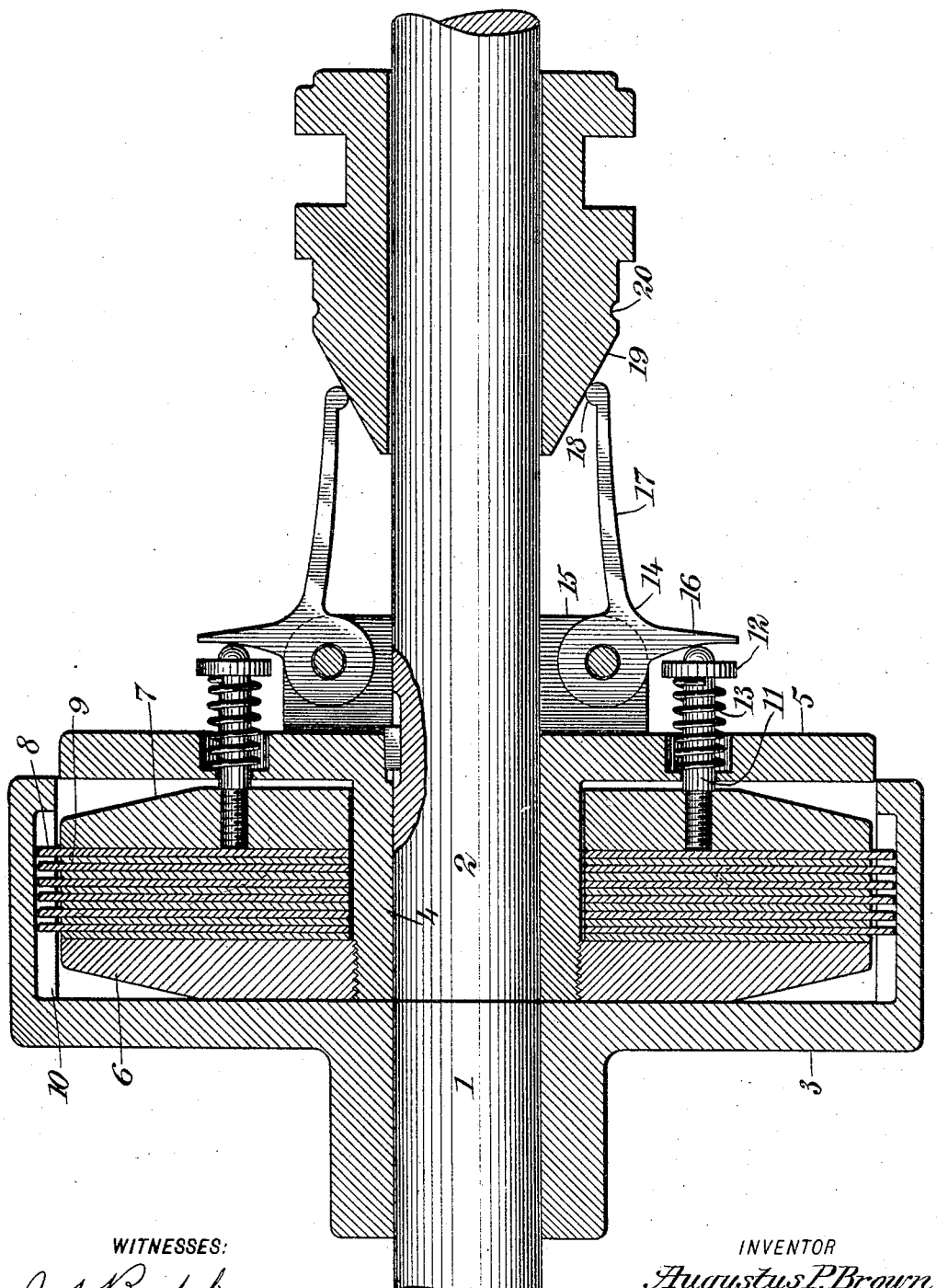
WITNESSES:
J. T. Brophy
C. R. Ferguson
INVENTOR
Augustus P. Brown
BY
ATTORNEYS No. 773,370.

Patented October 25, 1904.

UNITED STATES PATENT OFFICE.

AUGUSTUS P. BROWN, OF NEW YORK, N. Y.

FRICTION-CLUTCH.

SPECIFICATION forming part of Letters Patent No. 773,370, dated October 25, 1904.

Application filed May 9, 1904. Serial No. 206,980. (No model.)

*To all whom it may concern:*

Be it known that I, AUGUSTUS P. BROWN, a citizen of the United States, and a resident of the city of New York, (Bensonhurst,) borough of Brooklyn, in the county of Kings and State of New York, have invented a new and Improved Friction-Clutch, of which the following is a full, clear, and exact description.

This invention relates to improvements in friction-clutches for shafting or pulleys, an object being to provide a simple and novel means for holding the friction parts together with a uniform pressure, thus reducing the wearing away of the parts to a minimum.

I will describe a friction-clutch embodying my invention and then point out the novel features in the appended claim.

Reference is to be had to the accompanying drawing, forming a part of this specification, in which the figure is a sectional view of a friction-clutch embodying my invention.

Referring to the drawing, 1 and 2 designate the two shaft members, on one of which is mounted a pulley 3, which, as clearly indicated, is made hollow. Rigidly mounted on the shaft-section 2 is a hub 4, on the outer end of which is an annular flange 5, and secured to the inner end of the hub, as here shown by means of screw-thread engagement, is a stop-ring 6, and movable on the hub is a follower-ring 7. Arranged between the follower and the stop ring are friction-plates 8 9, the plates 9 alternating with the plates 8, and said plates 8 have peripheral notches for receiving ribs 10, formed in the inner surface of the pulley 3. Therefore these plates 8 will be caused to rotate with the pulley. Push rods or bolts 11 are connected to the follower 7 and pass outward through openings in the flange 5, and arranged between the flange and the heads 12 of the bolts are springs 13, which serve to force the bolts outward when relieved from pressure, and consequently draw the follower-ring 7 outward to relieve the pressure on the friction-plates.

Angle-levers 14 are pivotally connected to lugs 15, attached to the flange 5, and the outwardly-extended portions 16 of these levers engage with the outer ends of the bolts 11. The portions 17 of the levers which extend substantially parallel with the shaft 2 are spring-yielding, and at their ends they are provided with heads 18, which engage with an actuating-sleeve 19. This sleeve has a tapered end, so that when it is moved lengthwise of the shaft the levers will be caused to swing and force the follower 7 inward. The sleeve 19 is provided with an annular channel for receiving the shifting lever, and it is also provided with an annular channel 20 for receiving the heads 18 of the angle-levers, thus yieldingly locking the said angle-levers in engagement with the sleeve.

In the operation as the sleeve 19 is moved toward the clutch the angle-levers will be rocked, so as to force the follower 7 inward to tightly clamp the several friction-plates together. Owing to the resilient members of the angle-levers, however, a slight relative movement of the plates may be permitted, so as to prevent breaking of the parts upon the sudden starting of the shaft. When the sleeve 19 is moved outward, the springs 13, as before mentioned, will cause the follower 7 to be moved outward, relieving the several plates 8 and 9 of their frictional contact.

Having thus described my invention, I claim as new and desire to secure by Letters Patent—

A clutch comprising a member attached to a shaft-section, a second member attached to another shaft-section, friction devices arranged between said members, the said second member having openings, bolts passing through said openings for pressing upon the friction devices, springs for moving the bolts outward, angle-levers having swinging relation to said second member and having outwardly-extended portions for engaging with said bolts, and resilient portions extended lengthwise of the shaft, and a tapered sleeve movable on a shaft-section and engaging with the resilient portions of the angle-levers.

In testimony whereof I have signed my name to this specification in the presence of two subscribing witnesses.

AUGUSTUS P. BROWN.

Witnesses:
JNO. M. RITTER,
C. R. FERGUSON.